United States Patent [19]

Velupillai et al.

[11] Patent Number: 4,810,511

[45] Date of Patent: Mar. 7, 1989

[54] PROCESS FOR PARBOILING RICE

[75] Inventors: Lakshman Velupillai; Lalit R. Verma, both of Baton Rouge, La.; Marcel Tsangmuichung, Hilo, Hi.

[73] Assignee: Louisiana State University and Agricultural and Mechanical College, Baton Rouge, La.

[21] Appl. No.: 937,923

[22] Filed: Dec. 4, 1986

[51] Int. Cl.$^4$ ............................................. A23L 1/182
[52] U.S. Cl. ................................... 426/242; 426/243; 426/460; 426/462
[58] Field of Search ............... 426/459, 460, 461, 462, 426/242, 243; 219/10.55 E

[56] References Cited

U.S. PATENT DOCUMENTS

| | | | |
|---|---|---|---|
| 2,752,247 | 6/1956 | Chandler | 426/462 |
| 2,758,031 | 8/1956 | Ozai-Durrani | 426/461 |
| 3,597,240 | 8/1971 | Foltz | 426/242 |
| 3,626,838 | 12/1971 | Gorakhpurwalla | 426/243 |
| 4,361,593 | 11/1982 | Brooks et al. | 426/462 |
| 4,442,130 | 4/1984 | Autrey et al. | 426/462 |
| 4,520,574 | 6/1985 | Sugisawa et al. | 34/5 |
| 4,649,055 | 3/1987 | Kohlwey | 426/449 |

OTHER PUBLICATIONS

Bhattacharya et al., "Parboiling of Rice", *Rice: Chemistry and Technology* (2nd Ed. 1985), pp. 289–348.

*Primary Examiner*—Donald E. Czaja
*Assistant Examiner*—Mary S. Mims
*Attorney, Agent, or Firm*—Llewellyn A. Proctor; James M. Pelton

[57] ABSTRACT

This invention relates to a process for parboiling rough rice, which process includes: (1) soaking the rough rice; (2) subjecting the soaked rough rice to a first value of microwave energy to partially gelatinize the starch in the rice and raise its water content; (3) draining free water, if any, from the treated soaked rough rice; and (4) subjecting the drained rough rice from (3) to a second level of microwave energy to effect substantially complete gelatinization and to lower the rough rice water content.

8 Claims, No Drawings

PROCESS FOR PARBOILING RICE

BACKGROUND OF THE INVENTION

This invention relates to a novel, efficient process for parboiling rice.

The parboiling of rice has its genesis principally in India. In the early history of parboiling, the rough (paddy) rice was simply soaked in warm water overnight and then dried in the sun. The apparent benefit from parboiling was that the rice hulls were split open and were thus easily removed from the rice kernel. In modern times, it has been further realized that such parboiling provides a more nutritional rice as thiamine and other essential nutrients, which are normally present in the rice bran, migrate to the rice endosperm during the water soaking. Since almost all rice is milled to remove the bran, this migration preserves at least some of the nutritional values originally contained in the bran. Parboiling is also beneficial as the starch in the rice endosperm is changed from a crystalline amorphic state to an amorphous state. With the starch in the crystalline state, the kernel is tougher and thereby provides a higher yield of whole rice kernels after milling.

Today, approximately 22% of the rice produced in the United States is parboiled commercially. Commercial parboiling processes generally include the steps of: (1) soaking the rough rice in 50°–70° C. water for 3 to 4 hours to yield a rough rice having a 30 wt. % water content; (2) draining the free water from the soaked rough rice; (3) applying steam heat under pressure for 15 to 20 minutes to the soaked rough rice to effect gelatinization of the rice starch and to raise the water content to about 35 wt. %; and (4) drying the steamed rice with hot air to reduce its water content to about 14 wt. % water. (All of the above weight percents are on a wet basis.) The dried, parboiled rough rice is then ready for milling.

Even though this type of process is widely used, it is disadvantaged in that the use of 50°–70° C. soaking water, steam under pressure and hot air make it energy intensive, time consuming and thus, depending upon the source of fuel, expensive. It has been calculated, based upon natural gas having a heat content of 33.5 MJ/m$^3$ and a cost of $0.21/m$^3$, that the energy requirements for the soaking, steaming and drying would cost at least $16.14/1000 Kg of parboiled rough rice. Such an expense makes it difficult for processors having no cheaper fuel available to them to compete in the world market.

It is therefore an object of this invention to provide a process for producing parboiled rice which is energy efficient, exhibits high yields and reduces process times.

THE INVENTION

The process of this invention produces a high yield of high grade parboiled rice without high energy and time requirements. In accordance with the process of this invention, rough rice is first soaked in water at a temperature of from about 40° C. to about 70° C. until it has a water content within the range of from about 26 wt. % to about 32 wt. %. As used herein, all percentages by weight are on a wet basis, i.e., they are based upon the weight of the water content and the dry matter content of the rice. Subsequent to the soaking step, a slurry of water and the soaked rough rice is treated with a first value of microwave energy to partially gelatinize the starch in the endosperm portion of the rough rice and to raise the water content of the rough rice to a value within the range of from about 32 wt. % to about 40 wt. %. After treatment with the first value of microwave energy, the slurry is drained of substantially all of any remaining water. The treated, drained rough rice is then treated with a second value of microwave energy to substantially complete the gelatinization of the starch and to reduce the water content of the rough rice to about 27 wt. %. Subsequent to this treatment, the resultant rough rice is dried to reduce its water content to at least 14 wt. %.

In the soaking step, the soaking time is dependent upon the soaking temperature—the higher the soaking temperature the lower the time needed to achieve the desired water content in the rough rice. It is thus beneficial, from a process time standpoint, to use relatively high soaking temperatures, e.g., 70° C., but the use of such high temperatures require more energy and are therefore more expensive. It has been found that with the process of this invention, acceptable overall process times, e.g., from about 5 to about 8 hours, can be achieved with a soaking temperature of from about 40° C. to about 70° C. Soaking temperatures within this range will require a soaking period of from about 5 to about 3.5 hours, the lower temperatures requiring the longest soaking time and the higher temperatures requiring the lower soaking time.

The amount of soaking water used can vary so long as there is sufficient water to effect an increase in the water content of the rough rice in accordance with the before mentioned wt. % range. Generally speaking, the minimum amount of water needed will be that amount which is equal to the water lost to evaporation during the soaking period and the amount of water absorbed by the rough rice. Such a minimum, however, is not generally used due to process control factors and instead the use of a moderate excess of water is preferred. In the process of this invention, it is most highly preferred that the excess soaking water be in an amount which can provide a slurry of free water and rough rice which, after being treated with a first value of microwave energy in accordance with the second step of the subject process, will result in a charge of rough rice which is essentially without free water. In this case, there will be no need for draining the free water from the treated rough rice prior to its being subjected to the second value of microwave energy. Not only is process time minimized by avoiding the draining step, but also energy requirements are lowered as there is no heating of unnecessary free water. In keeping with these criteria, the amount of soaking water needed is determined empirically due to the several interdependent variables. These variables include the initial and ending water content of the rough rice, the loss of water to evaporation and the process equipment utilized.

It is also within the scope of this invention to use a modification of the above described soaking step for those instances in which equilibration of the water content of the rough rice is desired. The soaking step occurs within the same temperature and time parameters mentioned above, however, the soaking step is modified by draining substantially all of the free water from the soaked rough rice and storing the rough rice under conditions which are favorable towards water equilibration. This storage period is generally approximately 24 hours. In this case, the slurry of free water and soaked rough rice is made up by the addition of water to the stored soaked rough rice. The amount of water added should be no more than is necessary to provide the slurry and result in a charge of rough rice for treatment with the second value of microwave energy which is essentially void of free water all for the reasons previously mentioned above. The amount of water added to make such a slurry is determined empirically based upon initial and ending rough rice water content, losses of free water to evaporation and equipment design.

However the formation of the slurry of free water and soaked rough rice is achieved, be it taken directly from the soaking step or be it made up by the addition of water to the drained rough rice, the slurry is treated with a first value of microwave energy. This treatment effects partial gelatinization of the starch in the endosperm and raises the water content of the rough rice as before mentioned. To achieve these purposes, the first value of microwave energy is sufficient to raise the temperature of the slurry to a temperature within the range of from about 95° C. to about 100° C. in a time period less than about 40 minutes. Preferably, a temperature within this range is reached within from about 2 to about 15 minutes. Temperatures above this range should be avoided as they tend to result in cooking of the rice. Also the time period needed to obtain the temperature should not be excessively long as process efficiency is diminished.

For the purpose of this invention, the term "microwave energy" refers to electromagnetic radiation having a wavelength of 1 mm to 30 cm and which has a frequency range of about 915 MHz, 2450 MHz, 5800 MHz and 22,125 MHz as permitted by the Federal Communications Commission of industrial, scientific and medical uses. Microwave energy is equal to hf wherein h is Plank's Constant, i.e., $6\times 625\times 10^{-27}$ erg sec, and f is the frequency of the microwave electromagnetic radiation. The microwave energy can be provided by a conventional magnetron. The microwave energy is delivered by wave guides to the slurry in a vessel suitable for holding the slurry and for use with the emission of microwaves. Such a vessel is exemplified by conventional cylindrical vessel having a hopper bottom for contents discharge.

After the slurry of free water and soaked rough rice has been treated, it is desirable to drain substantially all of the free water from the slurry should there be any. This draining is energy efficient as the drained free water will not need to be removed thermally from the rough rice in subsequent steps.

The rough rice, which is now essentially void of free water, be it by draining or by judicious use of soaking or slurry water, is subjected to a second level of microwave energy to obtain the before mentioned substantial complete gelatinization and reduction in water content to about 22 wt %. The second value of microwave energy should be sufficient to achieve a temperature within the range of about 90° C. to about 110° C. within at least 120 minutes. Obtainment of a temperature within this range is preferably within a time period of from about 15 to about 90 minutes. Higher temperatures should be avoided so as to not cause cooking of the rough rice.

The rough rice, after this second microwave treatment, must be dried to contain no more than about 14 wt. % water so that it is suitable for milling. The drying can be achieved by passing hot air over the rough rice or by subjecting it to a third level of microwave energy.

The former is a conventional method and can be practiced by use of conventional dryers, e.g., rotary flash dryers, column dryers, etc. The hot air should have a temperature within the range of from about 50° C. to about 120° C.

It is most highly preferred to effect drying by the use of a third level of microwave energy as more efficient drying is achieved. The high drying efficiency is due to the fact that the microwaves preferentially heat the water molecules which results in diffusion of the energized water molecules from the rice endosperm to the surface of the rough rice. The surface water then easily evaporates from the rough rice. With preferential heating, there is no need to heat the solid contents of the rough rice to the diffusion temperature of the water molecules as is the case in conventional drying techniques.

The following Examples illustrate the principal of the process of this invention and are not to be taken as limiting the scope of this invention.

EXAMPLES

All of the following examples used long grain La-Belle variety rough rice obtained from the 1985 crop grown at Crowley, Louisiana. The commercially dried rough rice was cleaned in a Carter Dockage Tester according to the instructions set forth in the Grain Testing and Grading Manual of the U.S. Department of Agriculture. The clean rough rice was then passed through a Satake Sizing Device, Type TWS, to remove any slender/immature kernels. The sized rough rice was then mixed well and divided, using a Boerner Sampler, into 300 gm samples and sealed in individual plastic bags. Each 300 gm sample was individually submitted to processing which included a soaking stage, a period of moisture equilibration and a two-stage microwave heating. At the beginning of the process, each sample was checked for moisture using a Dickey-John Grain Analyzer. The samples were then soaked at 40° C. for 5 hours in a temperature controlled water bath. At the end of the soaking stage, the soak water was drained, the sample weighed and sealed in insulated plastic containers for 20 hours for moisture equilibration. The microwave heating was accomplished in a Sears portable microwave oven (stock number 88541, 1.4 cubic feet usable cavity, 90–625 watts). The details of the two-stage microwave heating are as follows:

Stage I. Power levels: 70, 80, 90, 100% of full power.
Duration at each power level: 10, 15 minutes.
Stage II. Power levels: 30, 50% of full power.
Duration at each power level: 8, 10 minutes. Just prior to the first microwave heating stage, 225 gm (Examples 1–32) and 300 gm (Examples 32–64) of water was added to the samples. At the end of Stage I and Stage II of the microwave heating, the samples were weighed. In addition, excess water, if any, was drained after Stage II and the sample weight recorded. The samples were then placed in mesh trays and placed in a screened cabinet for a minimum period of 10 days prior to milling analyses. This was under laboratory conditions of 60% Rh and 22° C.

At the end of the 10 day period, the moisture content of the samples was measured. A 150 gm lot from each sample was then shelled in a McGill sheller adjusted according to the USDA Grain Inspection Manual for long grain Southern grown rice. The weight of the brown rice (rough rice after husk removal) was recorded and the brown rice was then transferred to a previously cleaned McGill No. 2 mill for bran removal. A consistent setting for the weight on the arm of the mill and duration of milling was used for all the samples. Each milled rice sample was then hand graded to separate whole kernels, white centered kernels and broken kernels. Color analysis of the whole kernel portion was then performed on a Gardner Digital Tristimulus Colorimeter (Model XL-800).

The following Table gives the conditions and results of each Example. Whole kernel yield is defined as weight of whole kernels expressed as a percentage of rough rice on a weight basis. Total yield is defined as weight of total milled rice expressed as a percentage of rough rice on a weight basis.

TABLE

| Ex. # | Soak and Equilibrate | Water added (gm) | Stage I Microwave Heat Power Level (%) | Stage I Microwave Heat Time (min.) | Stage II Microwave Heat Power Level (%) | Stage II Microwave Heat Time (min.) | Whole Kernel Yield | Total Yield | Translucent Kernels (% whole) | Color Values | Final m.c. %* After St. II |
|---|---|---|---|---|---|---|---|---|---|---|---|
| 1 | (all samples were soaked at 40° C. for 5 hours and equilibrated for 20 hours) | 225 | 70 | 10 | 30 | 8 | 69.1 | 71.1 | 86.1 | 34.34 | 40.7 |
| 2 | | | | | | 10 | 73.3 | 73.8 | 87.9 | 36.65 | 42.2 |
| 3 | | | | | 50 | 8 | 72.9 | 73.9 | 94.1 | 38.72 | 40.0 |
| 4 | | | | | | 10 | 73.7 | 74.7 | 96.4 | 40.38 | 45.1 |
| 5 | | | | 15 | 30 | 8 | 72.6 | 73.2 | 88.3 | 36.74 | 42.7 |
| 6 | | | | | | 10 | 68.0 | 69.4 | 89.7 | 38.19 | 39.5 |
| 7 | | | | | 50 | 8 | 64.4 | 69.3 | 85.4 | 32.66 | 40.1 |
| 8 | | | | | | 10 | 73.1 | 74.3 | 96.7 | 40.28 | 35.7 |
| 9 | | | 80 | 10 | 30 | 8 | 73.9 | 74.6 | 95.9 | 38.94 | 40.5 |
| 10 | | | | | | 10 | 68.1 | 71.5 | 86.6 | 34.25 | 42.2 |
| 11 | | | | | 50 | 8 | 73.2 | 74.1 | 96.2 | 37.59 | 39.7 |
| 12 | | | | | | 10 | 72.4 | 73.2 | 87.7 | 37.59 | 41.4 |
| 13 | | | | 15 | 30 | 8 | 72.5 | 73.3 | 86.8 | 36.12 | 32.1 |
| 14 | | | | | | 10 | 72.5 | 73.6 | 87.9 | 38.30 | 36.9 |
| 15 | | | | | 50 | 8 | 74.4 | 75.1 | 97.4 | 42.50 | 35.7 |
| 16 | | | | | | 10 | 73.8 | 74.8 | 96.6 | 41.60 | 37.5 |
| 17 | | | 90 | 10 | 30 | 8 | 70.7 | 72.6 | 86.4 | 34.54 | 41.3 |
| 18 | | | | | | 10 | 74.6 | 75.5 | 97.9 | 41.07 | 46.1 |
| 19 | | | | | 50 | 8 | 66.8 | 71.3 | 85.2 | 34.33 | 39.8 |
| 20 | | | | | | 10 | 73.8 | 75.3 | 96.1 | 44.23 | 40.4 |
| 21 | | | | 15 | 30 | 8 | 72.7 | 73.8 | 96.6 | 38.93 | 38.4 |
| 22 | | | | | | 10 | 74.3 | 75.3 | 97.3 | 41.15 | 41.0 |
| 23 | | | | | 50 | 8 | 73.7 | 75.1 | 96.0 | 40.03 | 34.6 |
| 24 | | | | | | 10 | 64.6 | 69.6 | 87.8 | 35.78 | 29.7 |
| 25 | | | 100 | 10 | 30 | 8 | 64.7 | 70.6 | 88.0 | 34.52 | 40.4 |
| 26 | | | | | | 10 | 73.4 | 74.5 | 96.0 | 40.39 | 43.8 |
| 27 | | | | | 50 | 8 | 71.4 | 72.2 | 85.1 | 34.99 | 39.5 |
| 28 | | | | | | 10 | 69.8 | 72.2 | 86.6 | 34.28 | 37.2 |
| 29 | | | | 15 | 30 | 8 | 67.9 | 72.2 | 87.1 | 38.72 | 31.1 |
| 30 | | | | | | 10 | 72.5 | 73.8 | 88.0 | 36.49 | 31.5 |
| 31 | | | | | 50 | 8 | 72.5 | 74.2 | 96.5 | 39.66 | 32.8 |
| 32 | | | | | | 10 | 56.7 | 70.6 | 87.2 | 35.63 | 23.3 |
| 33 | | 300 | 70 | 10 | 30 | 8 | 63.7 | 70.0 | 89.5 | 34.29 | 42.0 |
| 34 | | | | | | 10 | 65.1 | 69.8 | 86.9 | 35.49 | 43.5 |
| 35 | | | | | 50 | 8 | 69.7 | 71.2 | 89.8 | 34.83 | 41.7 |
| 36 | | | | | | 10 | 74.3 | 75.4 | 95.8 | 42.24 | 44.1 |
| 37 | | | | 15 | 30 | 8 | 69.5 | 73.0 | 89.3 | 35.38 | 44.3 |
| 38 | | | | | | 10 | 70.8 | 72.8 | 87.1 | 36.59 | 45.0 |
| 39 | | | | | 50 | 8 | 70.4 | 73.4 | 88.9 | 38.18 | 44.5 |
| 40 | | | | | | 10 | 68.2 | 70.4 | 89.7 | 36.93 | 45.3 |
| 41 | | 300 | 80 | 10 | 30 | 8 | 70.5 | 72.2 | 88.9 | 34.42 | 41.9 |
| 42 | | | | | | 10 | 61.1 | 66.8 | 87.6 | 33.51 | 43.3 |
| 43 | | | | | 50 | 8 | 67.4 | 70.8 | 87.7 | 34.42 | 41.9 |
| 44 | | | | | | 10 | 64.3 | 70.4 | 87.9 | 34.52 | 43.9 |
| 45 | | | | 15 | 30 | 8 | 67.5 | 70.5 | 89.0 | 35.38 | 43.6 |
| 46 | | | | | | 10 | 72.2 | 73.7 | 88.2 | 38.78 | 42.5 |
| 47 | | | | | 50 | 8 | 65.2 | 70.5 | 90.9 | 36.14 | 44.5 |
| 48 | | | | | | 10 | 73.8 | 75.4 | 96.2 | 45.52 | 42.9 |
| 49 | | | 90 | 10 | 30 | 8 | 74.5 | 75.7 | 95.9 | 40.18 | 33.9 |
| 50 | | | | | | 10 | 71.8 | 73.0 | 88.2 | 34.16 | 43.8 |
| 51 | | | | | 50 | 8 | — | — | 88.0 | — | 42.4 |
| 52 | | | | | | 10 | 74.4 | 75.6 | 96.7 | 44.71 | 41.5 |
| 53 | | | | 15 | 30 | 8 | 73.3 | 74.5 | 95.2 | 40.45 | 47.9 |
| 54 | | | | | | 10 | 74.5 | 75.3 | 97.4 | 42.03 | 48.1 |
| 55 | | | | | 50 | 8 | 67.8 | 71.9 | 88.1 | 35.13 | 43.6 |
| 56 | | | | | | 10 | 73.2 | 74.3 | 96.7 | 40.71 | 41.4 |
| 57 | | | 100 | 10 | 30 | 8 | — | — | 89.9 | — | 41.3 |
| 58 | | | | | | 10 | 73.8 | 75.0 | 96.4 | 40.42 | 42.9 |
| 59 | | | | | 50 | 8 | 72.8 | 74.9 | 94.9 | 39.74 | 41.7 |
| 60 | | | | | | 10 | 73.6 | 74.4 | 96.1 | 38.82 | 41.6 |
| 61 | | | | 15 | 30 | 8 | 69.6 | 71.3 | 87.4 | 35.14 | 40.8 |
| 62 | | | | | | 10 | 73.2 | 74.3 | 88.0 | 38.33 | 41.3 |
| 63 | | | | | 50 | 8 | 71.4 | 72.6 | 87.0 | 38.18 | 36.5 |

TABLE -continued

| | | | Treatment Description | | | | Results | | | |
| | | | Stage I Microwave Heat | | Stage II Microwave Heat | | | | | Final |
| Ex. # | Soak and Equilibrate | Water added (gm) | Power Level (%) | Time (min.) | Power Level (%) | Time (min.) | Whole Kernel Yield | Total Yield | Translucent Kernels (% whole) | Color Values | m.c. %* After St. II |
| 64 | | | | | | 10 | 72.8 | 74.5 | 96.0 | 42.17 | 39.9 |

*m.c. % is percentage moisture content, wet basis.

A point of comparison between the subject process and conventional processes is the moisture content of the rough rice prior to final drying. In conventional processes, after steam treatment, the water content is about 36% and is finally hot air dried to 14% in the final drying. Thus, it would be advantageous if the water content could be below 36% before final drying to thereby reduce drying costs. The foregoing Examples show a water content after Stage II of from 23.38 wt. % (Example 32) to 46.1 wt. % (Example 18) for a mean value of 40.41%. The higher percentages are a result of free water being present after Stage II. The process used in the Examples did not include free water removal before Stage II nor was any attempt made to optimize the water content of the slurry fed to Stage I. Better results will be obtained if, as before described, the slurry of free water and rough rice has a water content which results in a charge of treated rough rice to Stage II which is essentially without free water. The savings in energy at the drying stage should not be offset by the heating in Stage II as microwave energy is more efficient than hot air heating due to the microwave's preferential heating of water molecules.

Not only is there an energy savings, but also, there is an equipment savings. In the process of this invention, the soaking step and all the microwave energy treatment and drying steps can occur in the same vessel as effecting gelatinization, water content adjustment and drying can be achieved by the same mode, i.e., by applying microwave energy to the slurry, etc. The levels of microwave energy needed for each step can be adjusted by the use of conventional electrical or electronic controls.

We claim:

1. A process for producing parboiled rice, which process comprises:
   (a) soaking rough rice in water at a temperature of from about 40° C. to about 70° C. until said rough rice has a water content within the range of from about 26 wt. % to about 32 wt. %;
   (b) treating a slurry of free water and the soaked rough rice from (a) with a first value of microwave energy to partially gelatinize the starch in the endosperm portion of said rough rice and to raise the water content of said rough rice to be within the range of from about 32 wt. % to about 40 wt. %;
   (c) draining substantially all of the free water, if any, from the treated slurry of free water and rough rice from (b);
   (d) treating the drained rough rice from (c) with a second value of microwave energy to substantially complete said gelatinization of said starch and to reduce the water content of the thus treated rough rice to about 22 wt. %; and
   (e) drying the rough rice from (d) to reduce its water content to at least 14 wt. %.

2. The process of claim 1 wherein said soaking in (a) is for a period of time within the range of from about 3.5 hours to about 5 hours.

3. The process of claim 1 wherein the temperature of the slurry of free water and rough rice in (b) is raised to be within the range of from about 95° C. to about 100° C. during said treatment in (b).

4. The process of claim 1 wherein the higheht temperature of the drained rough rice in (d) is within the range of from about 90° C. to about 110° C. during said treatment in (d).

5. The process of claim 1 wherein said drying in (e) is effected by passing hot air over the treated rough rice from (d).

6. The process of claim 2 wherein the temperature of the slurry of free water and rough rice in (b) is raised to be within the range of from about 95° C. to about 100° C. during said treatment in (b).

7. The process of claim 6 wherein the highest temperature of the drained rough rice in (d) is within the range of from about 90° C. to about 110° C. during said treatment in (d).

8. The process of claim 7 wherein said drying in (e) is effected by passing hot air over the treated rough rice from (d).

* * * * *